United States Patent Office 2,860,142
Patented Nov. 11, 1958

2,860,142
MANUFACTURE OF SULFENAMIDES

James C. Conly, Naugatuck, Conn., assignor to United States Rubber Company, New York, N. Y., a corporation of New Jersey No Drawing. Application April 2, 1957
Serial No. 650,066

4 Claims. (Cl. 260—306.6)

This invention relates to a new process for the conversion of monosulfenamides to bis(sulfen)amides as represented, without limitation, by the equation:

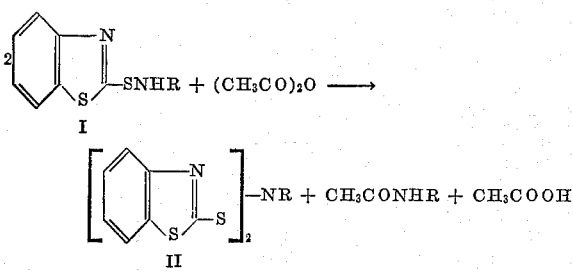

R represents an alkyl or cycloalkyl radical.

In general, the process consists in treating an N-alkyl or N-cycloalkyl benzothiazole-2-sulfenamide with acetic anhydride or homolog thereof, with or without the presence of a second solvent, at about 25 to about 75° C., for an appropriate period which can range from about 10 minutes to 24 hours, respectively, at elevated temperatures (e. g., 75° C.) or at low, e. g., room temperatures (e. g., 25° C.). The resulting bis(sulfen)amide is isolated by crystallization, dilution, or by stripping off the solvent. The yields are very good.

The reaction may be carried out in a 2 to 10 fold molecular excess of the anhydride over that required by theory. That is, for each 2 mole proportions of the monosulfenamide there may be used from 1 to 10 mole proportions of the anhydride, preferably from 1 to 4 mole proportions. The pure product crystallizes out, is filtered off, and then washed free of acetic acid. The excess anhydride mother liquors can be re-distilled and used again. In place of a large excess of anhydride being used as a solvent, a single molecular equivalent can be used, and the reaction be carried out in an inert solvent, e. g., benzene, solvent naphtha, and ethylene chloride. In this case, the product is soluble in the solvent and the acetic or other acid is removed by washing with water, the product then being separated from the solvent by distillation.

The chemicals are useful as accelerators in the vulcanization of any of the recognized sulfur-vulcanizable rubbers, natural, and synthetic. Propionic and butyric anhydrides may also be used and are generally to be considered equivalent to acetic anhydride in the process, that is, any of the anhydrides of the aliphatic monobasic acids having from 2 to 5 carbon atoms may be used. The starting materials can be relatively impure, but in any event should be anhydrous. The exact reaction may not be just as first above written, since excess anhydride can, for example, further react with the acetamide formed in the reaction to give a bis-acetamide, $(CH_3CO)_2NR$, and another mole of acetic acid. In any event, the major product remains the bis(sulfen)amide. A base, e. g., pyridine or triethylamine, to sequester the acetic or other acid may be used, if desired.

The following examples are given to illustrate the invention, in which the parts are by weight:

*Example 1.—N-isopropyl bis(benzothiazole-2-sulfen)-amide*

N-isopropyl benzothiazole-2-sulfenamide, 22.4 parts, was suspended in 100 parts acetic anhydride and warmed to 70° C. for 10 minutes at which temperature all of the starting sulfenamide dissolved. The mixture was cooled to 15° C. and allowed to stand 2 hours to complete crystallization. The crystalline bis(sulfen)amide was filtered off, and washed with water until free from acetic acid. The yield on drying was 18.5 parts (98% of theory) of white crystals, M. P. 103–106° C. The mother liquors were fractionally distilled to recover acetic acid and acetic anhydride, the latter being re-used in subsequent runs.

*Example 2.—N-cyclohexyl bis(benzothiazole-2-sulfen)-amide*

N-cyclohexyl benzothiazole-2-sulfenamide, 24 parts, was suspended in 50 parts of acetic anhydride and warmed slowly to 40° C. At 40° C. the monosulfenamide all dissolved and a slight exotherm was noted; the temperature climbed slowly to 45° C. The reaction mixture, maintained altogether 1 hour at 40–45° C., was then cooled to 20° C. The mother liquors were removed by filtration and the white crystalline bis(sulfen)amide washed with bicarbonate solution to free it from last traces of acetic acid. After air-drying 18.5 parts (94% of theoretical) of the bis(sulfen)amide was obtained melting at 125–128° C. The monosulfenamide used herein was ordinary commercial material, used without purification. Alternatively, the entire reaction mixture can be dumped into water and stirred to decompose excess anhydride. In this case, there was some contamination by N-cyclohexyl acetamide, but it did not adversely affect the curing strength or scorch resistance of the resulting product when tested in rubber.

*Example 3.—N-tert-butyl bis(benzothiazole-2-sulfen)-amide*

N-tert-butyl benzothiazole-2-sulfenamide, 23.8 parts was suspended in 110 parts of acetic anhydride and allowed to stand at 25° C. for 40 hours. At the end of this time the crystalline bis(sulfen)amide was filtered off, washed with water and dried. An essentially quantitative yield, 20 parts, of bis(sulfen)amide, melting at 135–138° C. was obtained. The starting monosulfenamide used in this example was commercial material, from which benzothiazole disulfide had been removed by solution, in ether, filtration, and evaporation to dryness.

*Example 4.—N-isopropyl bis(benzothiazole-2-sulfen)-amide*

Dissolved 22.4 parts of N-isopropyl monobenzothiazole-2-sulfenamide in 100 ml. of benzene. Added 21 parts of acetic anhydride and warmed to 50° C. for 1 hour. On cooling to 20° C. about 1 gram of benzothiazole disulfide precipitated and was filtered off. The benzene solution was washed with water and dilute bicarbonate solution to remove excess anhydride and acetic acid. The benzene was removed by steam-stripping, leaving a pink amorphous solid, M. P. 96–101° C. Analysis showed this to be 96% N-isopropyl bis(benzothiazole-2-sulfen)amide. Yield was 19 parts, 100% of theory. Other solvents used equally successfully were ethylene dichloride and commercial solvent naphtha (mixed xylenes).

*Example 5.—N-isopropyl bis(benzothiazole-2-sulfen)-amide*

A mixture of 22.4 parts of N-isopropyl benzothiazole-2-sulfenamide, 8 parts of pyridine and 50 parts of acetic anhydride was warmed to 70° C. for 10 minutes, cooled quickly and poured into water. After the excess anhydride had all reacted with the water, the residual solid was taken up in ethylene chloride, washed with dilute caustic and then with water. The solvent was allowed to evaporate, leaving pale green needles, M. P. 106–107° C., in 94% yield, 18.3 parts. A mixed melting point with the corresponding pure bis(sulfen)amide showed no depression.

Having thus described my invention, what I claim and desire to protect by Letters Patent is:

1. A process of making bis(sulfen)amides which comprises reacting an N-substituted monosulfenamide with a member selected from the class consisting of acetic, propionic, and butyric anhydrides.

2. A process of making bis(sulfen)amides which comprises reacting an N-substituted monosulfenamide with the anhydride of acetic acid.

3. A process of making bis(sulfen)amides which comprises reacting an N-substituted monosulfenamide with the anhydride of propionic acid.

4. A process of making bis(sulfen)amides which comprises reacting an N-substituted monosulfenamide with the anhydride of butyric acid.

No references cited.